INVENTOR.
LOUIS S. TOTH
BY STUART A. COLLINS, JR

ATTORNEY

INVENTOR.
LOUIS S. TOTH
BY STUART A. COLLINS, JR

ATTORNEY

United States Patent Office 3,664,723
Patented May 23, 1972

3,664,723
MEANS FOR HOLOGRAPHICALLY RECORDING A THREE-DIMENSIONAL MICROSCOPIC SAMPLE
Louis S. Toth, Worthington, and Stuart A. Collins, Jr., Columbus, Ohio, assignors to The Ohio State University, Columbus, Ohio
Filed June 27, 1969, Ser. No. 837,208
Int. Cl. G02b 27/22, 21/06
U.S. Cl. 350—3.5
11 Claims

ABSTRACT OF THE DISCLOSURE

A three-dimensional microscopic sample is recorded holographically consisting of a simultaneous record of every plane in the volume using a high numerical aperture but not necessarily perfect or abberation free lens. The volume sample is reconstructed using the same lens and is viewed using an ordinary microscope giving a virtually abberation-free reconstructed image of the volume. High magnification is possible because the fine structure information contained in the high spatial frequencies of the light scattered from the sample is recorded and reproduced.

BACKGROUND

Microscopic holography originated with Gabor's initial derivation of the holographic principle in 1948 (Gabor, D., "A New Microscopic Principle," Nature 161 (1948) p. 777). However, his work predated the era of the laser, and his experimental techniques can now be greatly simplified. Leith, Upatnieks, and Haines (Leith, E. N., Upatnieks, J. and Haines, K. A., "Microscopy by Wavefront Reconstruction," Journal of the optical Society of America, vol. 55, No. 8 (1965), p. 98v) modified the Gabor microscope but introduced aberrations with the magnification. Van Lighten and Osterberg (Van Lighten, R. F. and Osterberg, H., "Holographic Microscope" Nature, 211 (1966), p. 282) made holograms of magnified microscopic images by adding a reference beam to what would normally be a photomicrograph and realized a 40 micron depth of field. Ellis (Ellis, G. W., "Holomicrography: Transformation of Image During Reconstruction a Posteriori," Science, vol. 154 (Dec. 2, 1966), p. 1195) reconstructed a real image of the objective aperture plane and used optical data processing in the readout to examine the reconstructed sample by dark field, phase contrast or interference microscopy. Knox (Knox, C., "Holographic Microscopy as a Technique for Recording Dynamic Microscopic Subjects," vol. 153 (Aug. 26, 1966), p. 989) used a holographic system that recorded the unmagnified sample and read out the reconstruction with a microscope.

In Knox's experiment a pulsed laser was included with "stop action"; however, because his technique does not include an off-axis reference beam, the virtual image of the sample appears as a background to the real image that is read with the microscope. Additional limitations are encountered because no lens is employed in the sample beam thus decreasing the maximum spatial frequency that can be recorded and also storing the high spatial frequencies that are recorded in fringe planes that make large angles with normal holographic film that have large angulation and are more difficult to reconstruct.

The use of lenses can allow for recording of images of higher spatial frequencies but maintain discernable fringe plane angles.

However, lenses cannot be used without proper precaution because aberrations may be induced into the recorded field, or the lens may be corrected to favor one plane of focus consequently distorting all other planes in the volume.

SUMMARY OF INVENTION

The method and means of the present invention utilizes a lens in the object beam without introducing aberration in the reproduced sample volume, records a relatively large volume, and employs an off-axis reference beam for separation of images. The use of a microscope for read out is maintained to allow for the greatest flexibility in image interrogation. A brief description of the capabilities and principles behind microscopic holography together with the mathematical analysis of the holographic system, and the physical apparatus and experimental results are presented.

OBJECTS

It is a principal object of the present invention to provide a holographic recording with increased information content stored by recording more of the high spatial frequencies and consequently the fine detail of the specimen.

It is a further object of the invention to reconstruct the real image as it existed originally so that it may be interrogated with any microscopic read out technique desired.

It is another object of the invention to provide a holographic recording wherein no degradation is suffered from objective lenses in the recording process.

It is another object of the present invention to provide a holographic recording wherein any aberration present in the high numerical aperture lens used is removed upon reconstruction.

It is still a further object of the present invention to provide holographic recording with separation of real and virtual images.

It is another object of the present invention to provide holographic recording wherein the fringes in the hologram run in the proper direction to avoid fringe obscuration of the reconstruction beam.

For a complete understanding of the invention, together with other objects and advantages thereof reference may be made to the accompanying drawings in which:

DESCRIPTION OF THE PREFERRED EMBODIMENT

In accordance with the general concepts of the preferred embodiment of the invention a three-dimensional microscopic volume has been reconstructed with image separation, free of phase errors from the use of a lens, yet capable of preserving fine resolution even for thick samples. The reconstruction is indistinguishable from a physical sample.

Figure 1:
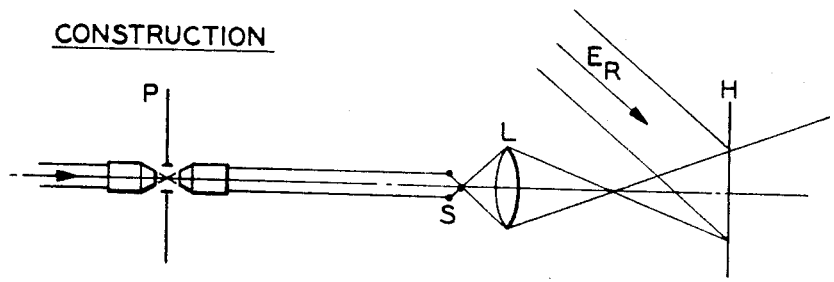
FIG. 1 is a simple schematic illustration of the microscopic holography system of the present invention.
Figure 1:
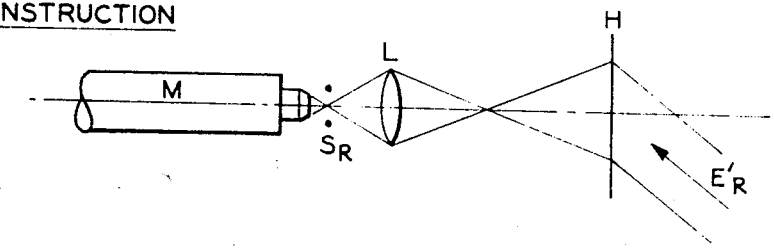

Referring specifically to the preferred embodiment shown in FIG. 1, light scattered from sample S is transmitted through the high numerical aperture lens L to hologram H. The hologram is also illuminated with the reference plane wave $E_R$. To reconstruct after developing film, H is illuminated from the opposite side with a beam collinear with $E_c$. The illuminating optics P are replaced with the viewing microscope M which has freedom to scan the whole volume.

The scattered field of the through transmission of a collimated beam illuminating the sample is captured by lens L. The lens provides for transformation from high spatial frequencies to large areas and puts the field to be recorded far enough away to allow the reference beam to be inserted at a reasonable angle. The geometry is such that the fringes are virtually independent of emulsion depth making reconstruction simple with a beam from the opposite side. Unlike focused image holograms, the fact that an image may be present in front of or behind the plane of the hologram is not important. The hologram is reconstructed by giving the "real image" term in the film transmission equation and using a plane wave reconstruction beam $E_R$ collinear with but in the opposite direction as the reference beam. The result is the reconstructed form which represents the original object field but traveling in the opposite direction. When this field passes through the lens again, the lens function cancels out its conjugate thus "decoding" the wave in a manner similar to that used by those making holograms through ground glass. The net result is the reconstruction of the fields defining the original sample, but traveling in the opposite direction. The reconstructed sample, as viewed from the left with the microscope as shown in FIG. 1, appears identical to the original sample as if it had been illuminated from the right and viewed from the left in its original position.

ANALYTICAL DESCRIPTION

Figure 4:
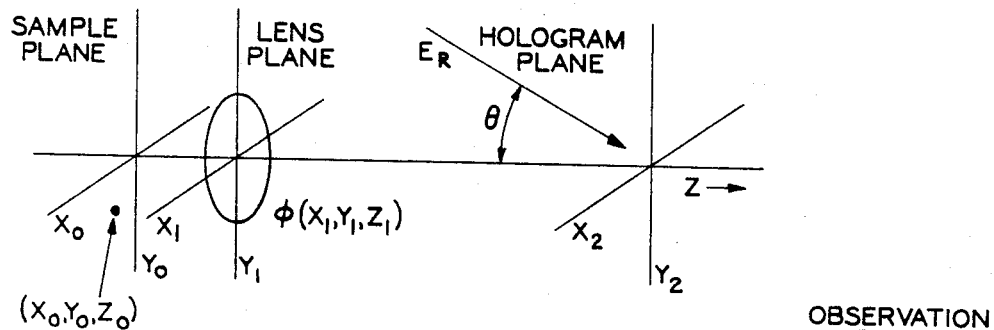
FIG. 4 is a coordinate plane designation for hologram construction for purposes of understanding the present invention.
Figure 5:
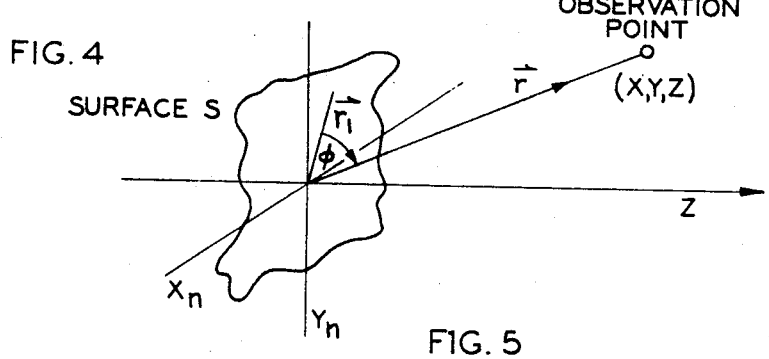
FIG. 5 is the geometry used for HKF diffraction integral for purposes of illustrating the present invention.

The detailed analytical description of the optical theory associated with the microscopic holography system shown in FIG. 1 is presented with reference to the simplified diagram shown in FIG. 4, where the sample, lens and hologram planes are identified with subscripts on the coordinate variables such that:

$(x_0, y_0, z_0)$ = coordinates of any point in the sample plane
$(x_1, y_1, z_1)$ = coordinates of any point in the lens plane
$(x_2, y_2, z_2)$ = coordinates of any point in the hologram plane.

An arbitrary point $(x_0, y_0, z_0)$ from the sample produces a field $E_1(x_1, y_1, z_1)$ at the lens plane. The lens' effect is taken as $$a_1 e^{i\phi(x_1, y_1, z_1)}$$

where $a_1$ is a constant amplitude factor due to coating and possible reflections and phase factor $\phi(x_1, y_1, z_1)$ which includes not only the focusing property of the lens but also aberrations, and imperfections. The field leaving the lens is then:

$$E_{1L} = a_1 E_1(x_1, y_1, z_1) e^{i\phi(x_1, y_1, z_1) - i\omega t} \quad \text{(Eq. 1)}$$

Applying the Hygens-Kirchhoff-Fresnel (HKF) diffraction integral is the same as finding the net effect of the spherical waves radiated from each point on a wavefront. The results can be evaluated at any plane in the direction of propagation. The general form is given by:

$$E(x, y, z) = \frac{-ik}{2\pi} \int_s \frac{E(\vec{r_1}) e^{ik|\vec{r}-\vec{r_1}|} \cos\phi}{|\vec{r}-\vec{r_1}|} ds$$

(Eq. 2)

where $s$ is the exit pupil surface
$\vec{r}$ is vector from origin to point of observation
$\vec{r_1}$ is vector from original to incremental area $ds$
$E(\vec{r_1})$ is the field that exists in the incremental area $ds$
$\phi$ is the angle between $\vec{r_1}$ and $\vec{r}$ In most instances the distances to the point of observation will be large with respect to the maximum dimensions of the surface $s$ (i.e.) $\vec{r} \gg \vec{r_1}$. Under such conditions $\cos\phi = 1$ and Equation 2 simplifies to:

$$E(x, y, z) = \frac{-ik}{2\pi} \iint E(\vec{r_n}) e^{ik} \left( z - z_n + \frac{(x-x_n)^2 + (y-y_n)^2}{2(z-z_n)} \right) dx_n dy_n$$

(Eq. 3)

where $n = 1$.

Equation 3 makes use of the binomial expansion of:

$$|\vec{r}-\vec{r_n}| = \sqrt{(x-x_n)^2 + (y-y_n)^2 + (z-z_n)^2}$$

(Eq. 4)

$$= (z-z_n)\sqrt{1 + \frac{(x-x_n)^2 + (y-y_n)^2}{(z-z_n)^2}}$$

(Eq. 4a)

$$\simeq z - z_n + \frac{(x-x_n)^2 + (y-y_n)^2}{2(z-z_n)}$$

(Eq. 4b)

For the denominator only the first term of Equation 4b is kept.

When Equation 1 is substituted for $E(\vec{r_1})$ into Equation 3, the field at plane $x_2 y_2$ is given as:

$$E_2(x_2, y_2, z_2) = \frac{-ik}{2\pi} \iint \frac{a_1 E_1(x_1, y_1, z_1)}{z_2 - z_1} e^{ik\phi(x_1, y_1, z_1)}$$

$$\times e^{ik\left[z_2 - z_1 + \frac{(x_2-x_1)^2 + (y_2-y_1)^2}{2(z_2-z_1)}\right] - i\omega t} dx_1 dy_1$$

(Eq. 5)

Unlike focused image holograms, the fact that an image may be present in front or behind the plane of the hologram is not important because the reconstruction is not viewed directly but rather is projected back through the lens.

A collimated reference is also incident on the film with the form $$E_R = b e^{i(k_y y + k_z z) - i\omega t} \quad \text{(Eq. 6)}$$

where $b$ is simply a constant amplitude factor.

Thus the irradiance recorded on the film is the familiar $$\text{Intensity} = |E_R + E_2|^2 \quad \text{(Eq. 7)}$$

$$|E_R|^2 + |E_2|^2 + E_R^* E_2 + E_R E_2^* \quad \text{(Eq. 7a)}$$

where a * superscript indicates the complex conjugate form. The last two terms of Equation 7a are fundamental to holography. They contain the virtual and real images respectively of the object field $E_2$. Note the first has $E_2$ in its original form which propagated from the object to the hologram. Wavefront reconstruction using this term reproduces $E_2$ as if it had come from behind the hologram. The second term has the complex conjugate form of $E_2$ which, if time were reversed, would be a backward traveling wave to its origin. This can create a real image which reconstructs the volume as it stood there and could be focused on a screen, one plane at a time, if desired.

Taking the transmission of light through the exposed and developed emulsion, provided the linear range of the H–D curve is used, $$\text{Transmission} = T\alpha [\text{Intensity}]^{-\gamma/2} \quad \text{(Eq. 8)}$$

where $\gamma$ is the slope of the H–D curve. This means after the photographic plate is exposed to the intensity function of Equation 7, the relative amplitude of light that would be transmitted through the plate would be $$T\alpha[|E_R|^2 + |E_2|^2 + E_R^* E_2 + E_R E_2^*]^{-\gamma/2}$$

(Eq. 9)

$$\simeq |E_R|^{-\gamma}\left[1-\gamma/2\,\frac{|E_2|^2}{|E_R|^2}-\gamma/2\,\frac{E_R^*E_2}{|E_R|^2}-\gamma/2\,\frac{E_RE_2^*}{|E_R|^2}\right]$$

(Eq. 9a)

provided $|E_R|^2 \gg |E_2|^2$. From Equation 9a it can be seen that the transmission will be proportional to the intensity provided the linear range of the H–D curve is used.

Figure 6:
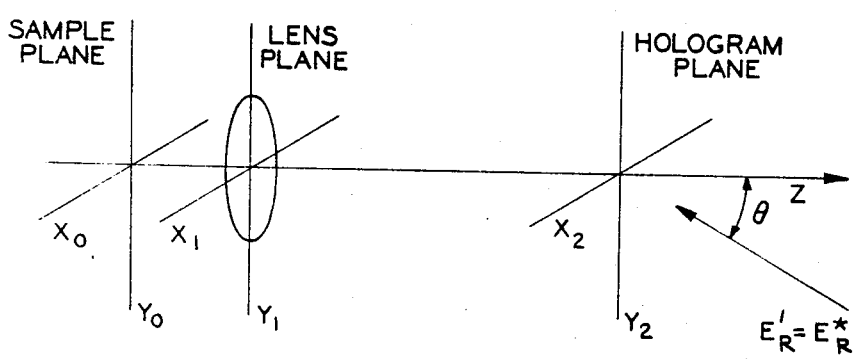
FIG. 6 is a coordinate plane designation for hologram reconstruction for purposes of understanding the present invention.

Imposing the linear transmission to the reconstruction process depicted in FIG. 6 makes the field leaving the hologram plane $$E'_{2L}=E'_R T=KE_R'\ \text{Intensity} \qquad \text{(Eq. 10)}$$

Primed quantities will be used to designate reconstructed values. Now if $E'_R$ is made to be the complex conjugate of $E_R$, Equation 10 becomes $$E'_{2L}=KE^*_R\,[|E_R|^2+|E_2|^2+E_R^*E_2+E_RE_2^*]$$

(Eq. 11)

$$=KE_R^*\,[|E_R|^2+|E_2|^2]+KE_R^{*2}E_2+Kb^2E_2^*$$

(Eq. 11a)

where K is a constant amplitude factor. The first term of Equation 11a continues to travel in the direction of $E_R^*$ in the same manner that a slide projector transmits a picture onto a screen. The second term is diffracted at an angle of $2\theta$ because of the $E_R^{*2}$ term. The last term is of special interest. It consists of only constants and the complex conjugate of the object field as was mentioned earlier.

Again applying the HFK diffraction integral to the field and evaluating the result at lens plane $x_1 y_1$ gives:

$$E_1'(x_1',y_1',z_1')=\left(\frac{-ik}{2\pi}\right)^2\frac{a_1b^2K}{(z_2-z_1)^2}$$

$$\times\int\int\int\int E_1^*(x_1,y_1,z_1)e^{-ik\phi(x_1,y_1,z_1)}$$

$$e^{-ik\left[z_2-z_1+\frac{(x_2-x_1)^2+(y_2-y_1)^2}{2(z_2-z_1)}\right]}e^{ik\left[z_2-z_1+\frac{(x_2-x_1')^2+(y_2-y_1')^2}{2(z_2-z_1)}\right]}$$

$$\times e^{-i\omega t}\,dx_1dy_1dx_2dy_2$$

(Eq. 12)

where $x_1'$ and $y_1'$ are arbitrary points but $z_1'=z_1$.

$$E_1'(x_1',y_1',z_1')=\left(\frac{-ik}{2\pi}\right)^2\frac{a_1b^2k}{(z_2-z_1)^2}e^{-i\omega t}$$

$$\int\int\int\int E_1^*(x_1,y_1,z_1)$$

$$e^{-ik\phi(x_1,y_1,z_1)}e^{\frac{ik\,[(x_2-x_1')^2+(y_2-y_1')^2-(y_2-y_1)^2]}{2(z_2-z_1)}}$$

$$e^{\frac{-ik(x_2-x_1)^2}{2(z_2-z_1)}}dx_1dy_1dx_2dy_2$$

(Eq. 12a)

$$=\left(\frac{-ik}{2\pi}\right)^2\left[\frac{a_1b^2k}{(z_2-z_1)^2}\right]^{-i\omega t}2e$$

$$\int\int\int\int E_1^*(x_1,y_1,z_1)$$

$$e^{-ik\phi(x_1,y_1,z_1)}e^{\frac{ik}{2(z_2-z_1)}[(x_1')^2-x_1^2+(y_1')^2-y_1^2]}$$

$$\times e^{\frac{ik}{z_2-z_1}[x_2(x_1-x_1')+y_2(y_1-y_1')]}dx_1dy_1dx_2dy_2$$

(Eq. 12b)

To evaluate Equation 12b recall that the Fourier transform of a delta function is an infinite spectrum of frequencies, so its inverse is:

$$\frac{1}{2\pi}\int_{-\infty}^{\infty}e^{ikx}dk=\delta(x) \qquad \text{(Eq. 13)}$$

In the optical case, when the radiation from a point source (infinite spectrum of spatial frequencies) is limited by a finite aperture, a band limited signal results; and rather than point or delta function, the inverse transform is an airy disc of forms like $$\frac{\sin x}{x}\,\frac{\sin y}{y}$$

or $$\frac{J_1(r)}{r}$$

depending on whether the aperture is square or round. However, the main portion of both of these forms are contained in a narrow width for good optical systems. And even though in Equation 12b the $x$ integral does not have infinite limits of integration, the rest of the integrand varies slowly over an area the size of the airy disc and consequently is approximately constant over this length. Hence accuracy is not impaired by evaluating the integral as though the limits were infinite unless a very small hologram is made.

Thus substituting in Equation 13 $x_2$ for $k$ and $$\frac{k}{z_2-z_1}(x_1-x_1')$$

for $x$ and similarly for the $y_2$ integration makes Equation 12b:

$$E_1'(x_1',y_1',z_1')=\frac{(-ik)^2 a_1b^2k}{(z_2-z_1)^2}e^{-i\omega t}$$

$$\times\int\int E_1^*(x_1,y_1,z_1)$$

$$e^{-ik\phi(x_1,y_1,z_1)}e^2\left(\frac{ik}{z_2-z_1}\right)[(x_1')^2-x_1^2+(y_1')^2-y_1^2]$$

$$\times\delta\left(\frac{k}{z_2-z_1}(x_1-x_1')\right)\delta\left[\left(\frac{k}{z_2-z_1}(y_1-y_1')\right)\right]dx_1dy_1$$

(Eq. 14)

Because of the properties of the delta function, Equation 14 is simply $$E_1'(x_1',y_1',z_1')=E_1'(x_1,y_1,z_1)$$

$$=\frac{k^2a_1b^2K}{(z_2-z_1)^2}E_1^*(x_1,y_1,z_1)e^{-ik\phi(x_1,y_1,z_1)}e^{-i\omega t}$$

(Eq. 15)

When this field passes back through the lens, the lens function $e^{ik\phi(x_1,y_1,z_1)}$ cancels out its conjugate thus "decoding" the wave.

The process of cancelling the phase term is similar to that used by those making holograms through diffuser materials as ground glass. The only term remaining from Equation 15 is the $E_1^*(x_1,y_1,z_1)$ times a constant factor and its time dependence $e^{-i\omega t}$.

If then the original field at the $x\,y$ plane had been just that of a spherical wave emitted from a point $(x_0,y_0,z_0)$, its form would have been $$E_1(x_1,y_1,z_1)=e^{ik\left[z_1-z_0+\frac{(x_1-x_0)^2+(y_1-y_0)^2}{2(z_1-z_0)}\right]}e^{-i\omega t}$$

(Eq. 16)

The reconstructed field then would have been given by:

$$E_1'(x_1,y_1,z_1)=K_0 e^{-ik\left[z_1-z_0+\frac{(x_1-x_0)^2+(y_1-y_0)^2}{2(z_1-z_0)}\right]}e^{-i\omega t}$$

(Eq. 17)

Thus the field from any arbitrary point $(x_0,y_0,z_0)$ is recreated, but now is converging to that point. Extrapolating this argument to all $(x_0,y_0,z_0)$'s in the sample volume gives a reconstruction of the sample volume at its original position with no more than an amplitude change and free of lens aberrations.

Figure 2:
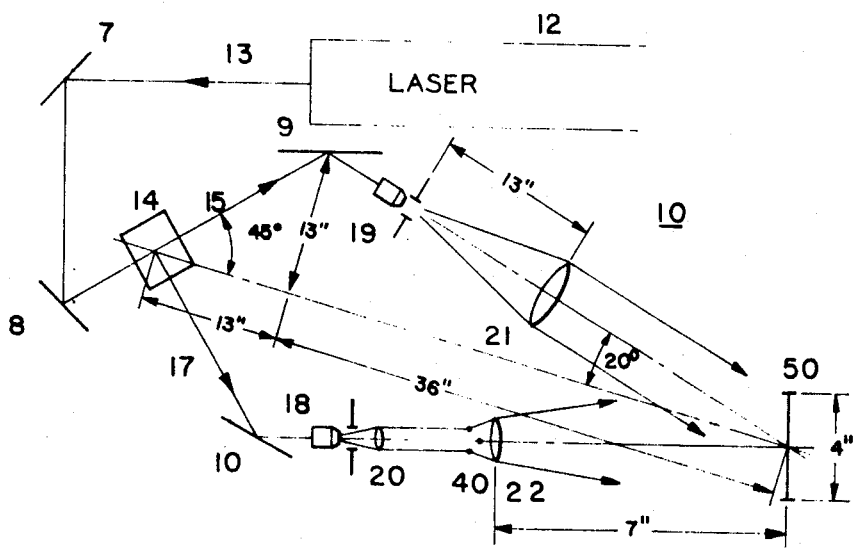
FIG. 2 is a complete microscopic holography schematic for hologram construction in accordance with a preferred embodiment of the present invention.

Referring now specifically to FIG. 2 there is shown the complete diagram of the constructed preferred embodiment of the present invention. The apparatus utilized in constructing holograms is supported by limestone table 10 supported by cement blocks cushioned with felt pads to provide a vibration free surface thereby assuring stationary fringes during film exposure. The laser 12 in this embodiment is a Spectra Physics model 125 Helium-Neon continuous wave gas laser. Mirrors 7 and 8 provide capability of vertically translating the laser beam 13 to run parallel to the table 10 top at the height required by the rest of the optical system. Beam splitter 14 has its diagonal plane pointed at the holographic plate. A symmetry is maintained between the mirrors 9 and 10 in order that the path lengths of the two beams 15 and 17 will be equal and that small coherence length tolerances can be maintained. The optical spatial filters 18 and 19 each consists of a 20× objective lens, a 5 micron pinhole, and micrometer screws for positioning adjustment. These filters remove all but a clean spatial DC term from the two beams 15 and 17 (clean meaning uniform over the wavefront). Lenses 20 and 21 are both collimaters; lens 21 provides the reference beam while lens 20 illuminates the sample 40.

If sample 40 should contain fine structure, it will diffract the light into large angles. This scattered light must be recorded by the hologram if the information is to be preserved. Thus lens 22 is capable of accepting a large cone of light and is positioned sufficiently close to the sample 40 that it will receive the highly divergent light from the sample 40. It is necessary that lens 22 has a high numerical aperture—the term referring to the cone of light acceptable by a lens.

Film used in the constructed embodiment was a film with an extremely fine grain size—needed to record the interference pattern of the two beams. Eastman Kodak 649-F film served the purpose and is available with an anti-reflective backing so that light will not reflect from the back surface of the glass and impinge onto the emulsion again. When only coarse information is to be recorded and higher spatial frequencies are not important, a holographic system can be arranged to ease the requirement for fine grain size.

Figure 3:
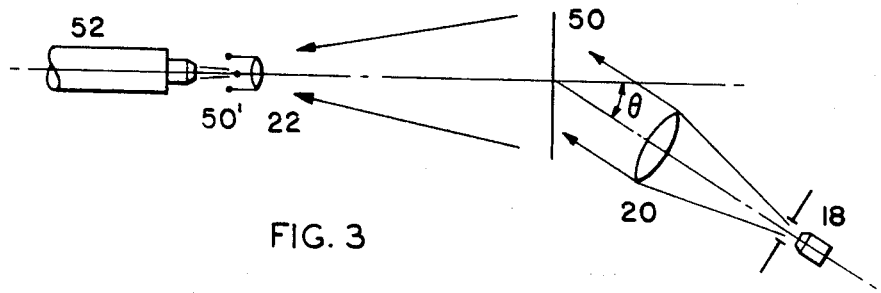
FIG. 3 is a schematic of the read out of reconstruction of the preferred embodiment of the present invention.

In order to reconstruct the hologram, the embodiment of FIG. 3 was used. Specifically the hologram was developed for 4.5 minutes in D 19, rinsed for 30 seconds in SB-1 stop bath, fixed for 7 minutes, washed in circulating water for 20 minutes and dried with forced air. It was then replaced in exactly the same position relative to lens 22 and illuminated with a collimated beam from the spatial filter 19 and lens 21 on the back side making the same angle $e$ as before. The real image, 40, of the reconstructed sample appears at the sample's original position and can be viewed with a conventional microscope 52. In essence, no distinction between the reconstructed sample and an actual physical sample is made.

In this embodiment an ordinary microscope body tube with objective and eyepiece was used. A practical simplification in experimental alignment is obtained if rather than holding the hologram and lens fixed and illuminating wtih the complex conjugate of $E_R$, $E_R$ is held fixed and the hologram-lens combination is rotated 180°. In this way the former $E_R$ is $E_R^*$. In order to maintain the same coordinate relationships, the hologram plane is established at the same $z_2$ location after rotation and the lens is fixed with respect to the hologram holder.

The fine detail information is preserved when a lens is used to capture the greatly divergent high spatial frequencies and a space-bandwidth trade-off is made. This lens also keeps the high spatial information from being stored in fringes which run in the wrong direction for good reconstruction. However, if an objective lens is used to create the image to be holographed, severe limitations in the volume to be recorded are imposed. A larger area would require a lower power objective with a consequent decrease in numerical aperture and hence loss of resolution. Objective lenses are corrected for one plane and degrade the information from all other planes. The lens in this system need not be of high quality, only high numerical aperture. It can then be of larger diameter, giving large volume recording capability. The microscope condenser lens performs well as it is designed to create a diverging beam greater than the cone of light accepted by any of the objectives that might be used with it—thus the objectives have a fully illuminated field of view under normal operation. With the off-axis reference, the additional capability of separation of images is inherent.

The present invention, and specifically the constructed preferred embodiment of FIGS. 2 and 3, above described, provides a hologram that meets the above-noted objectives and incorporates the features of the subject matter. For such semitransparent objects all points are illuminated by the original construction beam and are recorded on the hologram. Consequently all points are also reconstructed and viewing is normal.

The technique and system thus described incorporate six distinct features:

Increased information content stored by using a high numerical aperture lens to perform a space bandwidth trade off and thus record more of the high spatial frequencies and consequently the fine detail of the specimen.

The real image is reconstructed as it existed originally so that it may be interrogated with any microscopic read out technique desired.

No degradation is suffered from objective lenses in the recording process. Objective lenses are corrected for one plane of focus and distort all other planes resulting in greatly diminished depth of field. In addition, the objective lens has a very small field of view. If lower magnification objectives are used to increase the field of view, the lower numerical aperture also decreases the detail being recorded.

Any aberration present in the high numerical aperture lens used in construction are removed by reconstructing the image back through the lens.

The use of an off axis reference beam provides for separation of real and virtual images.

Fringes in the hologram run in the proper direction to avoid fringe obscuration of the reconstructed beam.

Although certain and specific embodiments have been shown it is to be understood that modifications may be made without departing from the true spirit and scope of the invention.

What is claimed is:

1. A system for recording holographically a three-dimensional microscopic sample comprising:
    means for illuminating said sample with a collimated beam of light,
    means for simultaneously illuminating said halogram with a construction plane wave reference light beam,
    a high numerical aperture lens for transmitting therethrough the light scattered by said sample, said high numerical aperture lens being operable to provide for the transformation from high spatial frequencies to large areas and for positioning said collimated beam to permit said reference beam to be inserted at an angle greater than the highest spatial frequency yet not approaching 90° and thereby decreasing intensity incident onto the photographic plate,
    a hologram for receiving said scattered light projected through said lens,
    means for reconstructing said hologram further comprising illuminating said hologram on the side opposite to said first and second mentioned illumination with a light beam collinear to said plane wave light beam, and
    means for microscopically viewing light reconstructed from said hologram, said last named means having the freedom to scan the whole volume of reconstructed sample.

2. The system for recording holographically a three-dimensional microscopic sample as set forth in claim 1 wherein said first named illuminating beam light is a laser beam.

3. A system for recording holographically a three-dimensional microscopic sample as set forth in claim 1 wherein said high numerical aperture lens is further operative to keep the high spatial information from being stored in fringes thereby preventing said information from running in the direction approaching parallelism with the emulsion surface.

4. The system for recording holographically a three-dimensional microscopic sample as set forth in claim 1 further comprising in reconstructing said hologram means prior to said illuminating said hologram for developing, fixing, rinsing, and washing said hologram.

5. The system for recording holographically a three-dimensional microscopic sample as set forth in claim 1 further comprises in reconstructing said hologram said illumination on the opposite side of said hologram collinear with the construction illumination.

6. The system for recording holographically a three-dimensional microscopic sample as set forth in claim 1 wherein said last named means is a microscope.

7. The system for recording holographically a three-dimensional microscopic sample as set forth in claim 1 wherein the reference beam is held fixed and said hologram and said lens are rotated 180° about the hologram Y axis for reconstruction.

8. The system for recording holographically a three-dimensional microscopic sample as set forth in claim 2 wherein said means for simultaneously illuminating said hologram comprises a beam splitter for providing a pair of light beams, means positioning one of said pair on said sample and the other of said beams directly on said hologram.

9. The system for recording holographically a three-dimensional microscopic sample as set forth in claim 8 wherein said positioning means comprises a pair of mirrors and a pair of spatial filters.

10. The system for recording holographically a three-dimensional microscopic sample as set forth in claim 9 wherein said positioning means for illuminating said sample further comprises a collimater lens on the side of said sample opposite to said high numerical aperture lens.

11. The system for recording holographically a three-dimensional microscopic sample as set forth in claim 9 wherein said positioning means further comprises a reference beam lens for illuminating said hologram directly.

References Cited

Ellis, "Holomicrography: Transformation of Image During Reconstruction a Posteriori," 154 Science, pp. 1195–7, December 1966.

Rosen, IEEE, pp. 79–80, January 1967.

DAVID SCHONBERG, Primary Examiner

R. L. SHERMAN, Assistant Examiner

U.S. Cl. X.R.

350—12